United States Patent
Henry

(10) Patent No.: US 11,277,955 B2
(45) Date of Patent: Mar. 22, 2022

(54) SYSTEM AND METHOD FOR ADJUSTING THE ALIGNMENT OF GROUND ENGAGING TOOLS OF AN AGRICULTURAL IMPLEMENT

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon (CA)

(*) Notice: Subject to any disclaimer, the term of this patent is extended or adjusted under 35 U.S.C. 154(b) by 350 days.

(21) Appl. No.: 16/595,647

(22) Filed: Oct. 8, 2019

(65) Prior Publication Data
US 2021/0100154 A1 Apr. 8, 2021

(51) Int. Cl.
| | |
|---|---|
| A01B 63/00 | (2006.01) |
| A01B 71/02 | (2006.01) |
| A01B 21/08 | (2006.01) |
| A01B 63/24 | (2006.01) |

(52) U.S. Cl.
CPC .......... *A01B 63/008* (2013.01); *A01B 21/086* (2013.01); *A01B 63/24* (2013.01); *A01B 71/02* (2013.01)

(58) Field of Classification Search
CPC ....... A01B 63/008; A01B 63/24; A01B 63/28; A01B 63/30; A01B 63/32; A01B 21/086; A01B 71/02
USPC .......................................................... 172/139
See application file for complete search history.

(56) References Cited

U.S. PATENT DOCUMENTS

| | | | | |
|---|---|---|---|---|
| 948,030 A | * | 2/1910 | Warner | A01B 63/32 |
| | | | | 172/398 |
| 5,878,821 A | * | 3/1999 | Flenker et al. | A01B 25/00 |
| | | | | 172/569 |
| 6,192,993 B1 | | 2/2001 | Flenker | |
| 7,743,844 B2 | | 6/2010 | Kovach | |

(Continued)

FOREIGN PATENT DOCUMENTS

| | | | | |
|---|---|---|---|---|
| CA | 2968181 C | * | 2/2019 | ............. A01B 63/16 |
| DE | 102012016348 A1 | * | 2/2014 | ............. A01B 63/24 |
| EP | 0619937 A1 | * | 10/1994 | ............ A01B 21/086 |

OTHER PUBLICATIONS

Robert Grisso, "Planter/Drill Considerations for Conservation Tillage Systems," Virginia Cooperative Extension, Publication 442-457, 2014 (10 pages) https://www.pubs.ext.vt.edu/content/dam/pubs_ext_vt_edu/442/445-457/445-457-pdf.pdf.

*Primary Examiner* — Tara Mayo-Pinnock
(74) *Attorney, Agent, or Firm* — Rebecca L. Henkel; Rickard K. DeMille

(57) ABSTRACT

A system for adjusting the alignment of ground engaging tools of an agricultural implement may include a first toolbar configured to support a first plurality of tools aligned along a first tool axis, and a second toolbar configured to support a second plurality of tools aligned along a second tool axis. The second toolbar may be movable relative to the first toolbar between a first toolbar position and a second toolbar position such that the second tool axis is movable relative to the first tool axis. The system may additionally include an actuator configured to actuate the second toolbar between the first toolbar position, where the first and second tool axes are substantially coincident, and the second toolbar position, where the second tool axis is substantially spaced apart from the first tool axis.

20 Claims, 6 Drawing Sheets

(56) References Cited

U.S. PATENT DOCUMENTS

| | | | |
|---|---|---|---|
| 8,047,299 B2 | 11/2011 | Hurtis | |
| 8,047,301 B2 | 11/2011 | Friggstad | |
| 8,408,149 B2 | 4/2013 | Rylander | |
| 8,746,361 B2 | 6/2014 | Hake | |
| 8,783,375 B2 | 7/2014 | Naylor | |
| 8,909,436 B2 | 12/2014 | Achen | |
| 9,485,900 B2 | 11/2016 | Connell | |
| 9,648,799 B2 | 5/2017 | Ohnsat | |
| 9,668,399 B2 * | 6/2017 | Gates | A01B 79/005 |
| 9,861,022 B2 | 1/2018 | Bassett | |
| 9,918,422 B2 | 3/2018 | Campbell | |
| 9,968,030 B2 | 5/2018 | Kowalchuk | |
| 9,980,421 B1 | 5/2018 | Hammes | |
| 10,238,022 B2 * | 3/2019 | Gray et al. | G06Q 20/348 |
| 2008/0230243 A1 * | 9/2008 | Evin | A01B 21/086 172/569 |
| 2014/0116736 A1 * | 5/2014 | Dietrich, Sr. | A01B 61/044 172/664 |
| 2015/0040528 A1 * | 2/2015 | Grotelueschen et al. | A01D 46/08 56/10.1 |
| 2017/0079194 A1 * | 3/2017 | Janelle et al. | A01B 63/32 |
| 2018/0352718 A1 | 12/2018 | Kovach | |
| 2019/0357416 A1 * | 11/2019 | Hughes | A01B 49/027 |
| 2020/0163271 A1 * | 5/2020 | Redekop | A01B 63/32 |

\* cited by examiner

SYSTEM AND METHOD FOR ADJUSTING THE ALIGNMENT OF GROUND ENGAGING TOOLS OF AN AGRICULTURAL IMPLEMENT

FIELD OF THE INVENTION

The present subject matter relates generally to agricultural implements, and more particularly, to a system and associated method for adjusting the alignment of ground engaging tools of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow disks, leveling disks, rolling baskets, shanks, tines, and/or the like. Such ground engaging tool(s) loosen and/or otherwise agitate the soil to prepare the field for subsequent planting operations.

Adjacent disk blades of disk assemblies of a tillage implement may be aligned and spaced apart along a tool axis. Typically, such alignment and spacing is fixed such that the performance of the tillage implement is not adjustable, which may affect the overall tillage quality and subsequent agricultural operations within the field, such as a planting operation.

Further, during tillage operations, field materials, such as residue, soil, rocks, and/or the like, may become trapped or otherwise accumulate between adjacent ground engaging tools, particularly between disk blades of disk assemblies. Such accumulation of field materials may inhibit the operation of the disk blades in a manner that prevents the disk blades from providing adequate tillage to the field. In such instances, it is necessary for the operator to take certain corrective actions to remove the material accumulation. However, it may be time consuming for the tillage implement operator to manually remove the material accumulation between the disk blades.

Accordingly, an improved system for adjusting the alignment of ground engaging tools of an agricultural implement and a related method would be welcomed in the technology.

BRIEF DESCRIPTION OF THE INVENTION

Aspects and advantages of the invention will be set forth in pail in the following description, or may be obvious from the description, or may be learned through practice of the invention.

In one aspect, the present subject matter is directed to a system for adjusting the alignment of ground engaging tools of an agricultural implement. The system includes a first toolbar configured to support a first plurality of tools, with the first plurality of tools being aligned along a first tool axis. The system further includes a second toolbar configured to support a second plurality of tools, with the second plurality of tools being aligned along a second tool axis. The second toolbar is movable relative to the first toolbar between a first toolbar position and a second toolbar position such that the second tool axis is movable relative to the first tool axis. A portion of at least one tool of the second plurality of tools is positioned axially between an adjacent pair of tools of the first plurality of tools when the second toolbar is in the first toolbar position. The system additionally includes an actuator configured to actuate the second toolbar between the first and second toolbar positions. When the second toolbar is in the first toolbar position, the second tool axis is positioned at a first distance relative to the first tool axis. When the second toolbar is in the second toolbar position, the second tool axis is spaced apart from the first tool axis by a second distance, where the second distance is greater than the first distance.

In some aspects, the present subject matter is directed to an agricultural implement having a frame, a first toolbar supported by the frame member, and a second toolbar supported by the frame member. The first toolbar is configured to support a first plurality of disk blades, with the first plurality of disk blades being rotatable about a first tool axis. The second toolbar is configured to support a second plurality of disk blades, with the second plurality of disk blades being rotatable about a second tool axis. The second toolbar is movable relative to the first toolbar between a first toolbar position and a second toolbar position such that the second tool axis is movable relative to the first tool axis. When the second toolbar is in the first toolbar position, the second tool axis is positioned at a first distance relative to the first tool axis, where the first distance is less than or equal to a radius of the first plurality of disk blades. When the second toolbar is in the second toolbar position, the second tool axis is spaced apart from the first tool axis by a second distance, where the second distance is greater than the first distance.

In further aspects, the present subject matter is directed to a method for adjusting the alignment of ground engaging tools of an agricultural implement. The agricultural implement includes a first toolbar configured to support a first plurality of tools, with the first plurality of tools being aligned along a first tool axis. The agricultural implement further includes a second toolbar configured to support a second plurality of tools, with the second plurality of tools being aligned along a second tool axis. The method includes receiving, with a computing device, an input associated with adjusting the alignment between the first plurality of tools and the second plurality of tools. Additionally, the method includes controlling, with the computing device, an operation of an actuator based on the received input to actuate the second toolbar relative to the first toolbar from a first toolbar position, where the second tool axis is positioned at a first distance relative to the first tool axis, the first distance being less than or equal to a predetermined spacing distance, to a second toolbar position, where the second tool axis is spaced apart from the first tool axis by a second distance, the second distance being greater than the first distance. A portion of at least one tool of the second plurality of tools is positioned axially between an adjacent pair of tools of the first plurality of tools when the second toolbar is in the first toolbar position.

In additional aspects, the present subject matter is directed to a method for managing material accumulation relative to ground engaging tools of an agricultural implement. The agricultural implement has a first toolbar configured to support a first plurality of tools, with the first plurality of tools being aligned along a first tool axis. The agricultural implement further has a second toolbar configured to support a second plurality of tools, with the second plurality of tools being aligned along a second tool axis. The method includes receiving, with a computing device, an input associated with material accumulation relative to at least one pair of adjacent ones of the first and second plurality of tools. Additionally, the method includes controlling, with the computing device, an operation of an actuator based on the received input to actuate the second toolbar relative to the first toolbar from a first toolbar position, where the second tool axis is positioned at a first distance relative to the first tool axis, the first distance being less than or equal to a predetermined spacing distance, to a second toolbar position, where the second tool axis is spaced apart from the first tool axis by a second distance, the second distance being greater than the first distance. A portion of at least one tool of the second plurality of tools is positioned axially between an adjacent pair of tools of the first plurality of tools when the second toolbar is in the first toolbar position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
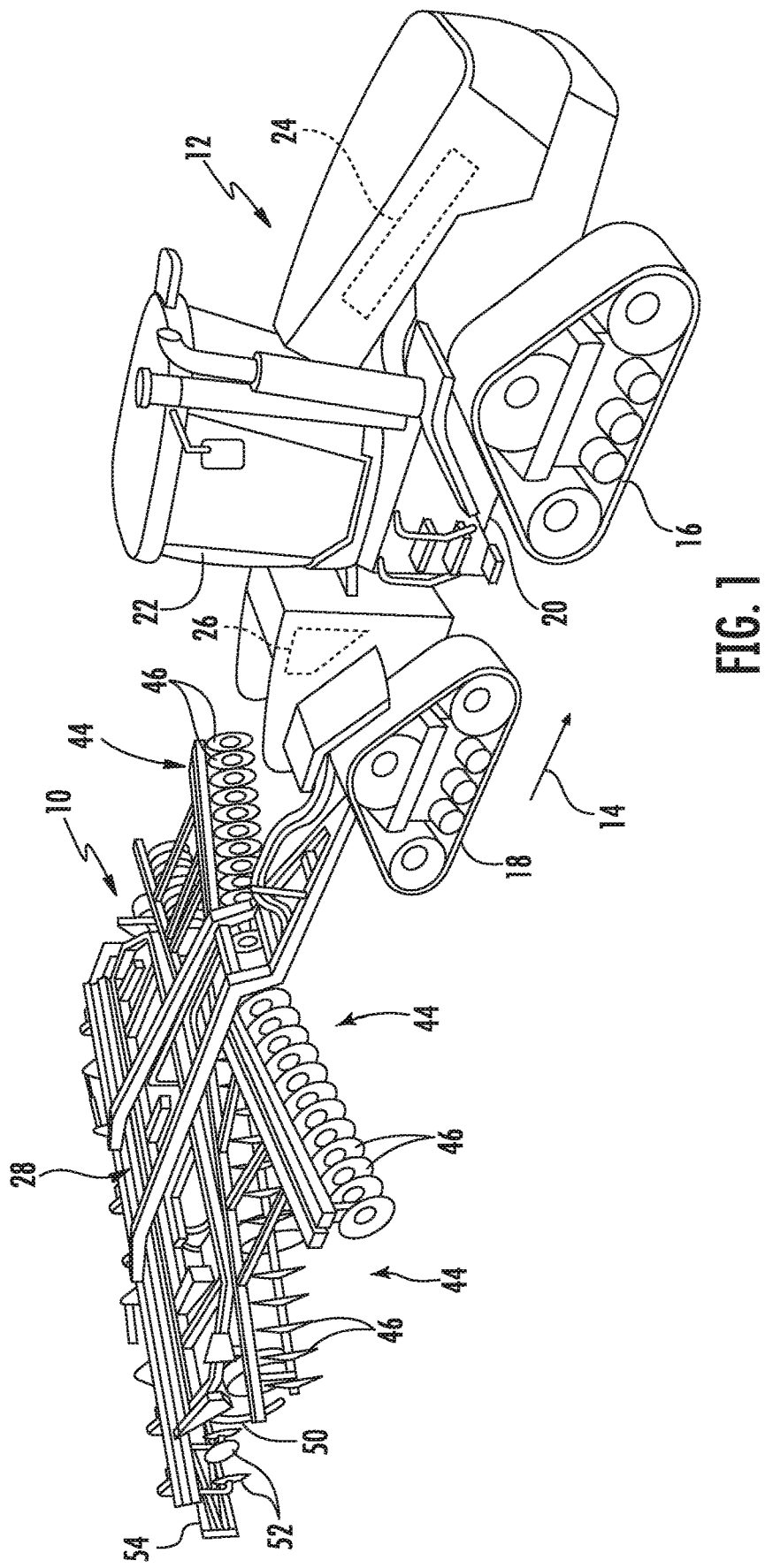
FIG. 1 illustrates a perspective view of one embodiment of an agricultural implement coupled to a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for adjusting the alignment of ground engaging tools of a ground engaging assembly of an agricultural implement, such as disk blades of a disk assembly of a tillage implement. For example, in several embodiments, the ground engaging assembly (e.g., disk assembly) includes a plurality of disk blades that are rotatable relative to the ground when the implement is moved across the field. A system may be provided in operative association with the ground engaging assembly to assist in adjusting the alignment between adjacent disk blades of the disk assembly to change or improve the performance of the implement.

More particularly, in several embodiments, the system includes a first toolbar configured to support a first plurality of disk blades and a second toolbar configured to support a second plurality of disk blades. The first plurality of disk blades is rotatable about a first tool axis and the second plurality of disk blades is rotatable about a second tool axis, with the disks of the first and second pluralities of disk blades being arranged in an alternating fashion along an axial direction of the ground engaging assembly such that each disk of the first plurality of disks is separated from adjacent disks of the plurality of first disks along the axial direction by a disk of the second plurality of disks. The second toolbar is movable relative to the first toolbar between a first toolbar position, where the first and second axes are spaced apart by a first distance such that the first and second tool axes are substantially coincident or coaxial, and a second toolbar position, where the first and second axes are spaced apart by a second distance, with the second distance being larger than the first distance such that the first and second tool axes are no longer substantially coincident. The first and second positions are spaced apart along at least one of a vertical direction or a longitudinal direction of the implement.

In several embodiments, a controller of the disclosed system may be configured to receive an input associated with adjusting the alignment of the disk blades of the ground engaging assembly. In response to the input, the controller may be configured to control the operation of an actuator provided in operative association with the ground engaging assembly to adjust the alignment between the tools of the ground engaging assembly. For instance, the controller may be configured to automatically control the operation of the actuator to actuate the second toolbar relative to the first toolbar between the first and second toolbar positions to adjust the alignment of the plurality of disk blades. In one embodiment, the actuator is configured to rotate the second toolbar between the first and second toolbar positions. In some embodiments, the actuator is configured to actuate the second toolbar in the vertical direction, the longitudinal direction, or both between the first and second toolbar positions.

The present subject matter may also be directed to systems and methods for managing material accumulation relative to ground engaging tools of an agricultural implement. For example, in some embodiments, a controller of the disclosed system may be configured to receive an input associated with field material accumulation or a "plugged condition" relative to at least one pair of adjacent tools of the ground engaging assembly. In such embodiments, the controller may control the operation of the actuator to adjust the alignment of adjacent tools as described above in an attempt to reduce material accumulation relative to the tools of the ground engaging assembly.

Figure 2:
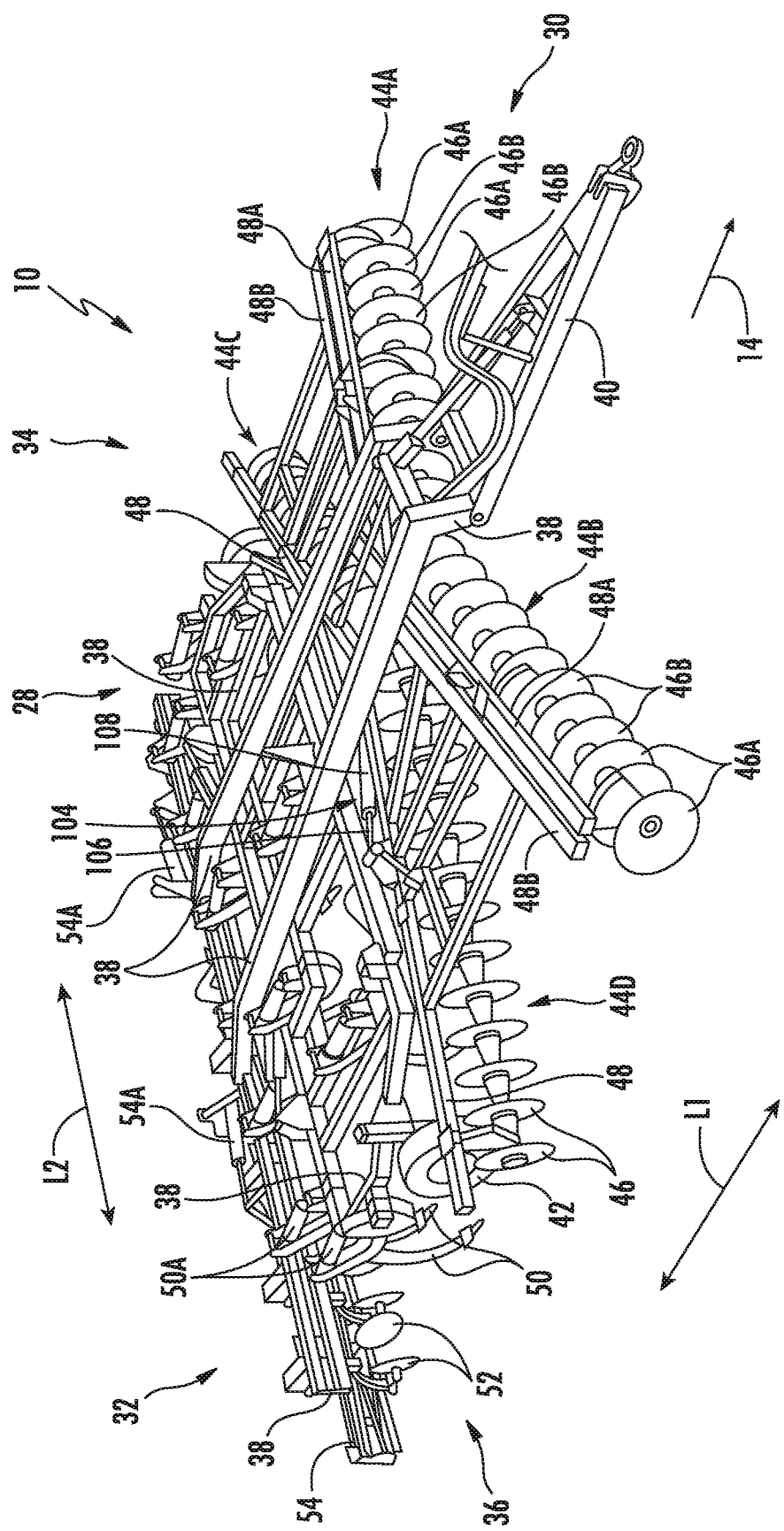
FIG. 2 illustrates an alternative perspective view of an agricultural implement in accordance with aspects of the present subject matter, particularly illustrating various ground engaging assemblies of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work Vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16 (only one of which is shown), a pair of rear track assemblies 18 (only one of which is shown), and a frame or chassis 20 coupled to and supported by the track assemblies 16, 18. An operator's cab 22 may be supported by a portion of the chassis 20 and may house various input devices (e.g., a user interface 260 shown in FIG. 7) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend along a longitudinal direction L1 defined between a forward end 30 and an aft end 32. The frame 28 may also extend along a lateral direction L2 defined between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more disk assemblies or sets 44 of disk blades 46, such as the first and second front disk assemblies 44A, 44B and the first and second rear disk gangs 44C, 44D. Each disk blade 46 may, in turn, be configured to penetrate or otherwise engage the soil as the implement 10 is being pulled through the field. In this regard, the various disk assemblies 44 may be oriented at an angle relative to the direction of travel 14 to promote more effective tilling of the soil. More particularly, the disk blades 46 are supported on a support arm 48 and rotatably coupled such that the disk blades 46 rotate together. However, in accordance with aspects of the present subject matter, the first and second front disk assemblies 44A, 44B have disk blades 46A, 46B that are individually mounted to a respective toolbar 48A, 48B of the respective disk assembly 44, as will be described in greater detail below.

It should be appreciated that, in other embodiments, the implement 10 may include any other suitable number of disk assemblies 44, such as more or fewer than four disk assemblies 44, having any suitable disk blade configuration. Furthermore, in one embodiment, the disk assemblies 44 may be mounted to the frame 28 at any other suitable location, such as adjacent to its aft end 32.

Moreover, in several embodiments, the implement 10 may include a plurality of disk assembly actuators 104 (one of which is shown in FIG. 2), with each actuator 104 being configured to move or otherwise adjust the orientation or position of at least one of the disk assemblies 44 relative to the implement frame 28. For example, as shown in the illustrated embodiment, a first end of each actuator 104 (e.g., a rod 106 of the actuator 104) may be coupled to the respective support arm(s) 48, 48A, 48B of the corresponding disk assembly 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disk assembly 44 relative to a lateral centerline (not shown) of the frame 28 and/or the penetration depth of the associated disk blades 46. In the illustrated embodiment, each actuator 104 corresponds to a fluid-driven actuator, such as a hydraulic or pneumatic cylinder. However, each actuator 104 may correspond to any other suitable type of actuator, such as an electric linear actuator.

Additionally, as shown, in one embodiment, the implement frame 28 may be configured to support other ground engaging tools. For instance, in the illustrated embodiment, the frame 28 is configured to support a plurality of shanks 50 or tines (not shown) configured to rip or otherwise till the soil as the implement 10 is towed across the field. Furthermore, in the illustrated embodiment, the frame 28 is also configured to support a plurality of leveling blades or disks 52 and rolling (or crumbler) basket assemblies 54. It should be appreciated that any other suitable ground-engaging tools may be coupled to and supported by the implement frame 28, such as a plurality closing disks.

It should also be appreciated that the configuration of the implement 10 and work vehicle 12 described above are provided only to place the present subject matter in an exemplary field of use. Thus, it should be appreciated that the present subject matter may be readily adaptable to any manner of implement or work vehicle configurations having any suitable ground engaging tools.

Figure 3:
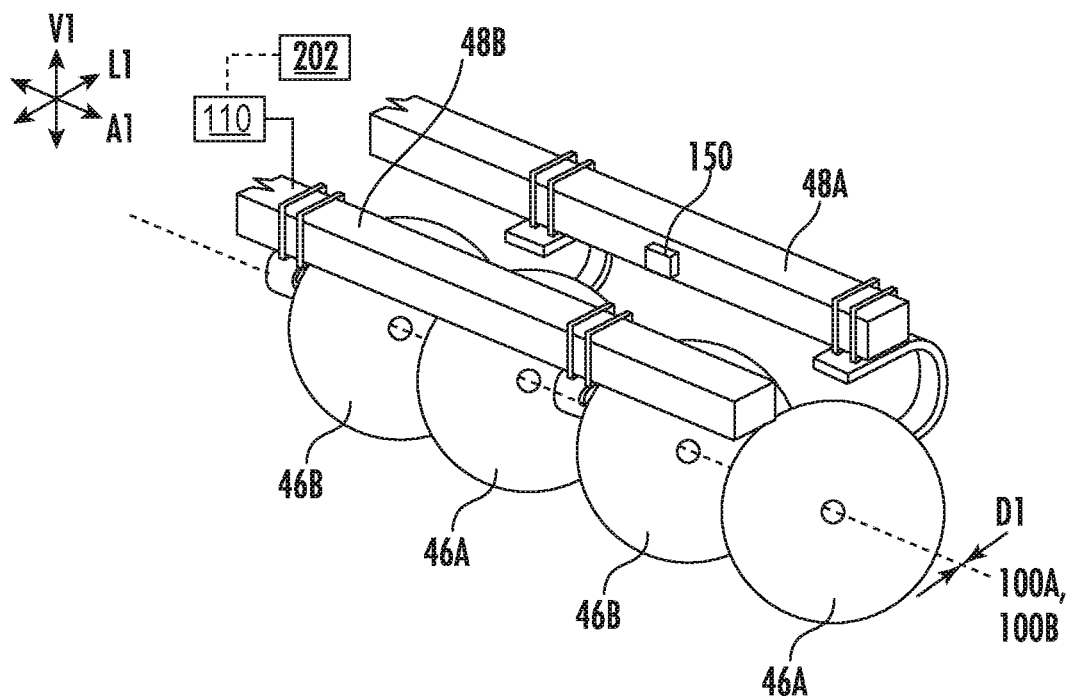
FIG. 3 illustrates a partial, perspective view of one embodiment of a ground engaging assembly of an agricultural implement in accordance with aspects of the present subject matter, particularly illustrating components of one embodiment of a system for adjusting the alignment of ground engaging tools of the ground engaging assembly.
Figure 4:
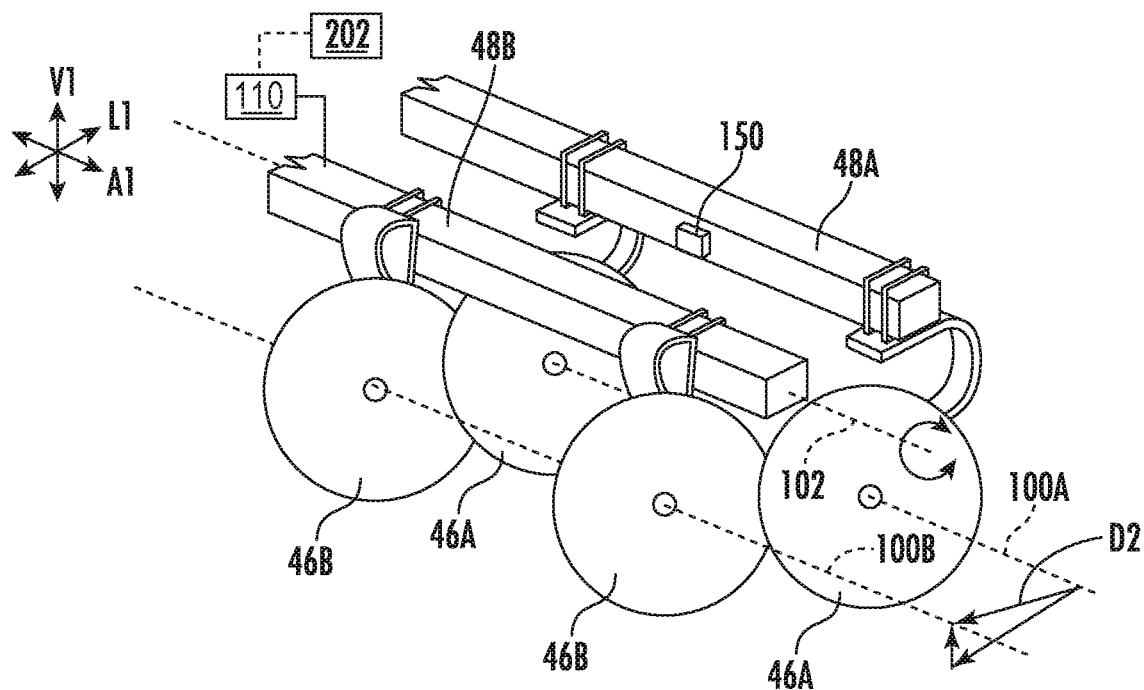
FIG. 4 illustrates another perspective view of the ground engaging assembly and system shown in FIG. 3 in accordance with aspects of the present subject matter, particularly illustrating the ground engaging assembly following rotational actuation of a portion of the ground engaging tools to adjust the tool alignment from the aligned position shown in FIG. 3 to an offset position.
Figure 5:
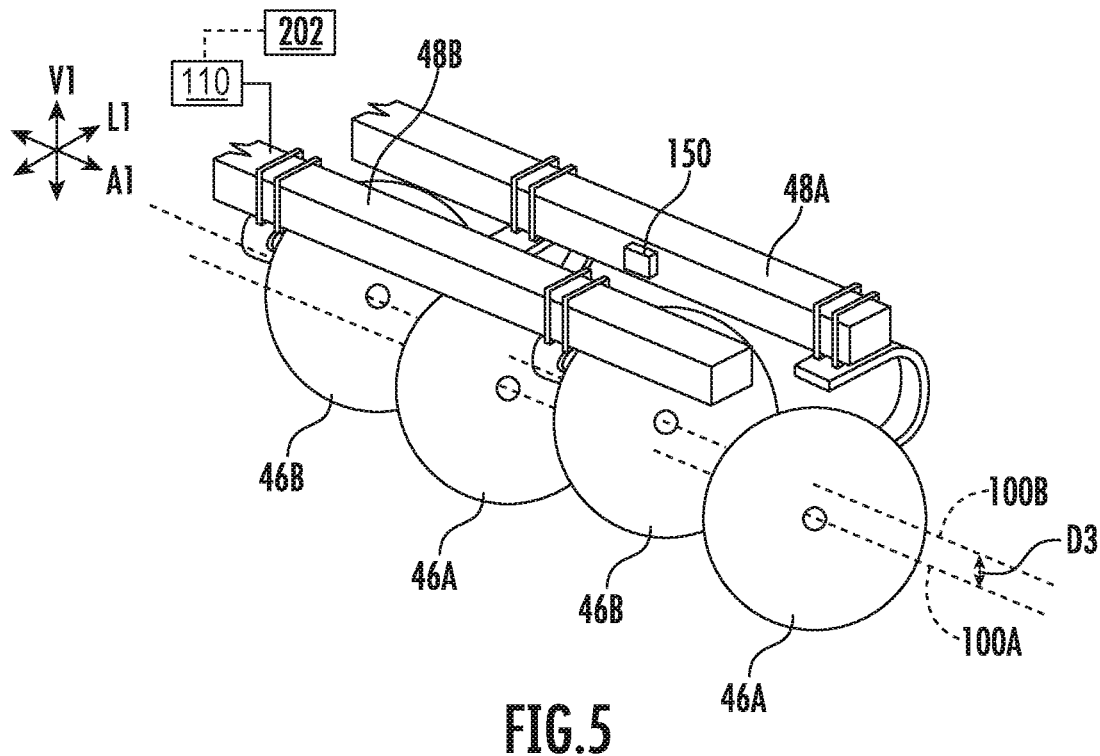
FIG. 5 illustrates yet another perspective view of the ground engaging assembly and system shown in FIG. 3 in accordance with aspects of the present subject matter, particularly illustrating the ground engaging assembly following linear actuation of a portion of the ground engaging tools to adjust the tool alignment from the aligned position shown in FIG. 3 to a vertically offset position.
Figure 6:
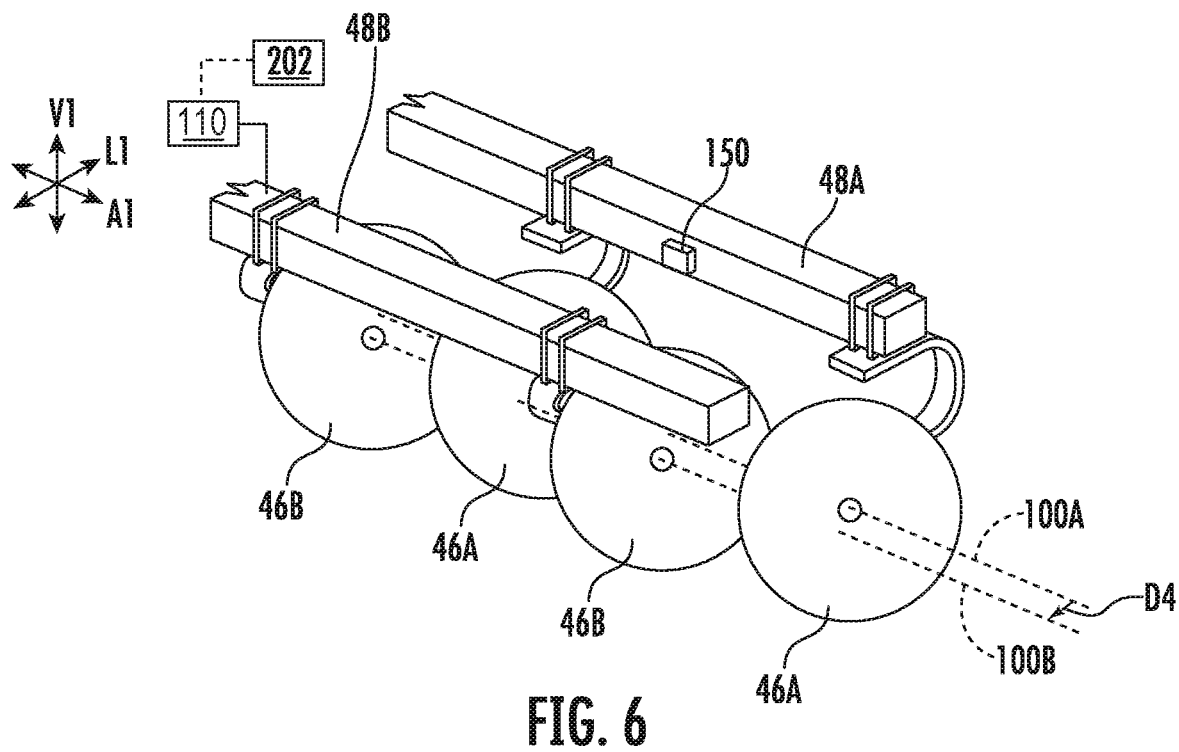
FIG. 6 illustrates a further perspective view of the ground engaging assembly and system shown in FIG. 3 in accordance with aspects of the present subject matter, particularly illustrating the ground engaging assembly following linear actuation of a portion of to adjust the tool alignment from the aligned position shown in FIG. 3 to a longitudinally offset position.

Referring now to FIGS. 3-6, various views of one embodiment of a ground engaging assembly (e.g., one of the disk assemblies 44 shown in FIGS. 1 and 2) are illustrated in accordance with aspects of the present subject matter. More particularly, FIG. 3 illustrates a partial, perspective view of one embodiment of a ground engaging assembly of an agricultural implement, particularly illustrating components of one embodiment of a system for adjusting the alignment of the ground engaging tools of the ground engaging assembly. FIG. 4 illustrates another perspective view of the ground engaging assembly and system shown in FIG. 3, particularly illustrating the ground engaging assembly following rotational actuation of a portion of the ground engaging tools to adjust the tool alignment from the aligned position shown in FIG. 4 to an offset position. FIG. 5 illustrates yet another perspective view of the ground engaging assembly and system shown in FIG. 3, particularly illustrating the ground engaging assembly following linear actuation of a portion of the ground engaging tools to adjust the tool alignment from the aligned position shown in FIG. 4 to a vertically offset position. Additionally, FIG. 6 illustrates a further perspective view of the ground engaging assembly and system shown in FIG. 3, particularly illustrating the ground engaging assembly following linear actuation of a portion of the ground engaging tools to adjust the tool alignment from the aligned position shown in FIG. 4 to a longitudinally offset position.

As indicated above, the disk assembly 44 has a plurality of disk blades 46, including a first plurality of disk blades 46A and a second plurality of disk blades 46B. Specifically, in accordance with aspects of the present subject matter, a system 200 may be associated with the disk assembly 44 for adjusting the alignment of the first and second pluralities of disk blades 46A, 46B. More particularly, the system 200 may include a first toolbar 48A configured to support the first plurality of disk blades 46A relative to the implement frame 28 and a second toolbar 48B configured to support the second plurality of disk blades 46B relative to the implement frame 28. In some embodiments, the second toolbar 48B may be directly supported by the frame 28. However, in other embodiments, the second toolbar 48B may be indirectly supported on the frame 28, such as by the first toolbar 48A. Further, in some embodiments, the first toolbar 48A may extend forward of the second toolbar 48B along the longitudinal direction L1. However, in other embodiments, the first toolbar 48A may instead extend rearward of the second toolbar 48B along the longitudinal direction L1.

In one embodiment, each of the first plurality of disk blades 46A is individually coupled to the first toolbar 48A and each of the second plurality of disk blades 46B is individually coupled to the second toolbar 48B, with each of the first and second pluralities of disk blades 46A, 46B being configured to rotate relative to its respective toolbar 48A, 48B. In this regard, the first and second pluralities of disk blades 46A, 46B are configured to rotate relative to the ground as the implement 10 is moved across a field during an agricultural operation to work the soil, e.g., to till the soil. For example, the first plurality of disk blades 46A are aligned such that each of the first plurality of disk blades 46A is rotatable about a first rotational axis 100A relative to the first toolbar 48A. Similarly, the second plurality of disk blades 46B are aligned such that each of the second plurality of disk blades 46B is rotatable about a second rotational axis 100B relative to the second toolbar 48B. The first and second rotational axes 100A, 100B generally extend through the centers of the respective first or second plurality of disk blades 46A, 46B. In one embodiment, the first and second rotational axes 100A, 100B are parallel to the axial direction A1.

The first and second pluralities of disk blades 46A, 46B may further be arranged on their respective toolbars 48A, 48B such that at least a portion of one disk blade of the second plurality of disk blades 46B is positioned axially between a pair of disk blades of the first plurality of disk blades 46A to form at least one interleaved set of adjacent disk blades of the first and second pluralities of disk blades 46A, 46B. For instance, in some embodiments, the first and second pluralities of disk blades 46A, 46B are arranged such that the disk blades of the first and second pluralities of disk blades 46A, 46B alternate along an axial direction A1, particularly such that each disk blade of the second plurality of disk blades 46B is positioned axially between a respective pair of adjacent disk blades of the first plurality of disk blades 46A. However, in other embodiments, the first and second disk blades 46A, 46B may be arranged in any other suitable way along the axial direction A1.

In general, in accordance with aspects of the present subject matter, the positioning of at least one of the toolbars 48A, 48B relative to the other toolbar, may be adjusted to change the alignment of the first and second pluralities of disk blades 46A, 46B. During operation of the implement 10, the relative alignment of the first and second pluralities of disk blades 46A, 46B is generally selected based on the desired performance and/or operating parameters of the ground engaging assembly. Particularly, at least one of the toolbars 48A, 48B may be actuated to change the alignment of the first and second pluralities of disk blades 46A, 46B apart along a vertical direction V1 and/or along the longitudinal direction L1.

In several embodiments, the system 200 includes an actuator 110 configured to actuate the second toolbar 48B relative to the first toolbar 48A to adjust the alignment of the first and second pluralities of disk blades 46A, 46B. In general, the first toolbar 48A may be fixed or otherwise moved independently of the second toolbar 48B such that the second toolbar 48B is movable relative to the first toolbar 48A. However, it should be appreciated that, in other embodiments, the actuator 110 may alternatively be configured to actuate the first toolbar 48A relative to the second toolbar 48B, or that a second actuator may be provided in connection with the first toolbar 48A for actuating the first toolbar 48A relative to the second toolbar 48B. It should additionally be appreciated that the actuator 110 may be configured as any suitable actuator capable of actuating the second toolbar 48B. For instance, in one embodiment, the actuator 110 may be configured as a linear actuator, such as a pneumatic or fluid driven actuator. In other embodiments, the actuator 110 may be configured as a rotational motor, screw-drive actuator, a worm-drive actuator, and/or the like.

When the second toolbar 48B is in a first toolbar position, as shown in FIG. 3, the first and second rotational axes 100A, 100B are spaced apart by a first distance D1. In one embodiment, such as the embodiment shown, the first distance is equal to zero, such that the first and second rotational axes 100A, 100B are substantially coincident or coaxial with one another. As a result, the disk blades 46A, 46B are substantially aligned in both the vertical direction V1 and the longitudinal direction L1. However, in other embodiments, the first distance D1 may be less than or equal to a predetermined spacing distance. In some embodiments, the predetermined spacing distance correlates to a maximum distance between the rotational axes 100A, 100B at which the implement 10 is ideally or normally operated. For example, in one embodiment, the predetermined spacing distance is equal to the radius of the first plurality of disk blades 46A. The actuator 110 may be controlled to move the second toolbar 48B between the first toolbar position (FIG. 3) and a second toolbar position (FIGS. 4-6), in which the first and second rotational axes 100A, 100B of the first and second pluralities of disk blades 46A, 46B are spaced apart by a second distance, where the second distance is generally greater than the first distance D1.

In one embodiment, as shown in FIG. 4, the second toolbar 48B may be configured to be rotatable about a toolbar axis 102. The second toolbar 48B and the toolbar axis 102 may generally extend along the axial direction A1, where the axial direction A1 extends at least partially along the longitudinal direction L1 and/or the lateral direction L2. In such embodiment, the actuator 110 may be configured to rotate or pivot the second toolbar 48B about the toolbar axis 102 from the first position to a second position to adjust the relative alignment of the first and second pluralities of disk blades 46A, 46B. In the second toolbar position, the first rotational axis 100A may be spaced apart from the second rotational axis 100B by a second distance D2, which extends at least partially in the longitudinal direction L1 and/or in the vertical direction V1, depending on the degree of rotation of the second toolbar 48B. Generally, due to the vertical and/or longitudinal offset created between the first and second pluralities of disk blades 46A, 46B, and thus between the first and second rotational axes 100A, 100B, the performance of the implement 10 is altered.

For example, the actuator 110 may be configured to rotate the second toolbar 48B about the toolbar axis 102 from the first toolbar position (FIG. 3) to the second toolbar position shown in FIG. 4, such that the second plurality of disk blades 46B is moved in the longitudinal and vertical directions L1, V1 towards a position rearward and above the first plurality of disk blades 46. Accordingly, when the second toolbar 48B is in the second position, the second plurality of disk blades 48B have a shallower penetration depth than the first plurality of disk blades 46A or may be completely raised out of the ground. However, the actuator 110 may rotate the second toolbar 48B in a second or opposite direction, such that the second plurality of disk blades 46B is moved along the longitudinal L1 to a position forward of the first plurality of disk blades 46A and/or along the vertical direction V1 to a position below the first plurality of disk blades 46A.

In another embodiment, the actuator 110 may be configured to linearly actuate the second toolbar 48B in the vertical direction V1. For instance, the actuator 110 may be configured to actuate the second toolbar 48B along the vertical direction V1 from the first toolbar position (FIG. 3) to a second toolbar position, such that the first and second rotational axis 100A, 100B are spaced apart along the vertical direction V1 by a second distance D3. For example, as shown in FIG. 5, the second toolbar 48B has been raised along the vertical direction V1 from its first position to its second position relative to the first toolbar 48A by the second distance D3 such that each of the second plurality of disk blades 469 has a shallower penetration depth than each of the first plurality of disk blades 46A (or such that the second plurality of disk blades 46B is raised completely out of the ground). However, in other embodiments, the second toolbar 48B may be lowered along the vertical direction V1 from its first position to its second position relative to the first toolbar 48A such that each of the second plurality of disk blades 46B has a deeper penetration depth than each of the first plurality of disk blades 46A.

In an additional embodiment, the actuator 110 may be configured to linearly actuate the second toolbar 48B along the longitudinal direction L1. For instance, the actuator 110 may be configured to actuate the second toolbar 48B along the longitudinal direction L1 from the first toolbar position (FIG. 3) to a second toolbar position, such that the first and second rotational axes 100A, 100B are spaced apart in the longitudinal direction L1 by a second distance D4. For example, as shown in FIG. 6, the second toolbar 48B is moved rearwardly from its first position to its second position along the longitudinal direction L1 by the second distance D4 such that the second plurality of disk blades 46B is positioned rearward of the first plurality of disk blades 46A along the direction of travel 14. However, in other embodiments, the second toolbar 48B may instead be moved forward from its first position to its second position along the longitudinal direction L1 such that the second plurality of disk blades 46B is positioned forward of the first plurality of disk blades 46A along the direction of travel 14.

Upon receipt of an input indicative of a request to change the relative alignment between the first and second pluralities of disk blades 46A, 46B, the operation of the actuator 110 is controlled such that the first and second pluralities of disk blades 46A, 46B are moved from their axially aligned positions, e.g., towards their offset positions. Specifically, the actuator 110 may be controlled to actuate the second toolbar 48B from its first toolbar position shown in FIG. 3 to its second toolbar position (FIGS. 4-6), or any position therebetween.

In some embodiments, the input indicative of a request to adjust the relative alignment between the first and second pluralities of disk blades 46A, 46B may be based on an operator input (e.g., the operator may provide an input via a user interface 260 to adjust the relative alignment between the first and second pluralities of disk blades 46A, 46B). In other embodiments, the input indicative of a request to adjust the relative alignment between the first and second pluralities of disk blades 46A, 46B may be based on input(s) from sensor(s), such as from material accumulation sensors (as will be described below) and/or sensors configured to monitor the output or effectiveness of the implement during the performance of an agricultural operation. In such embodiments, the actuator 110 may be automatically controlled based on the sensor input(s).

In one embodiment, the system 200 may also be configured to manage material accumulation relative to a ground engaging assembly of the implement 10. Particularly, in one embodiment, the relative alignment between the first and second pluralities of disk blades 46A, 46B may be adjusted when a plugged condition of adjacent disk blades 46A, 46B of the disk assembly 44 is detected. Specifically, as the implement 10 is moved across a field, the disk blades 46A, 46B may be configured to penetrate the soil surface of the field and rotate about the rotational axis 100A, 100B relative to the soil within the field such that field materials flow through the open spaces between the adjacent disk blades of the first and second pluralities of disk blades 46A, 46B. During normal, non-plugged operation of the disk assembly 44, substantially all of the field materials being processed by the disk assembly 44 flow through the open spaces.

In certain instances, however, a plugged condition may occur in which field materials accumulate between adjacent ones of the first and second pluralities of disk blades 46A, 46B. For example, when the soil in the field has high moisture content, the soil may stick or adhere to the disk blades 46A, 46B such that the soil accumulates within the open spaces. Moreover, a large chunk of residue or a rock may become lodged between a pair of adjacent ones of the first and second pluralities of disk blades 46A, 46B in a manner that inhibits the flow of field materials through the associated open spaces, thereby causing additional field materials to accumulate therein. As such, the disk blades 46A, 46B may become plugged and not perform as intended.

In some embodiments, the system 200 may include one or more material accumulation sensors 150 provided in operative association with the implement 10 for detecting such material accumulation. Generally, the material accumulation sensor(s) 150 may be configured to detect a parameter associated with plugging of the disk blades 46A, 46B. For example, in one embodiment, the material accumulation sensor(s) 150 may be configured as a vision sensor(s), such as a camera, configured to capture vision-based data. However, in alternative embodiments, the material accumulation sensor(s) 150 may be configured as any other suitable device for sensing or detecting plugging of the disk blades 46A, 46B, such as a contact-based sensing device configured to engage or contact the soil as the implement 10 is towed across the field and/or a rotation sensor configured to detect the rotational speed of the disk blade(s) 46A, 46B. The material accumulation sensor(s) 150 may be configured to transmit the data to a controller for subsequent processing and/or analysis. For example, the data from the sensor(s) 150 may be compared to one or more thresholds, above which it can be inferred that plugging is likely occurring. Additionally or alternatively, in some embodiments a controller of the system 200 may be configured to receive an input from an operator indicative of plugged condition of the disk assembly 44.

Upon detection of material accumulation relative to the disk blades 46A, 46B, the operation of the actuator 110 may be controlled such that the second toolbar 48B is moved towards its second toolbar position. Specifically, the actuator 110 is controlled to actuate the second toolbar 48B between its first toolbar position (e.g., the position shown in FIG. 3) towards its second toolbar position (e.g., one of the positions shown in FIGS. 4-6). As a result, the spacing between the rotational axes 100A, 100B of the first and second pluralities of disk blades 46A, 46B increases, which may help de-plug the disk assembly 44.

Figure 7:
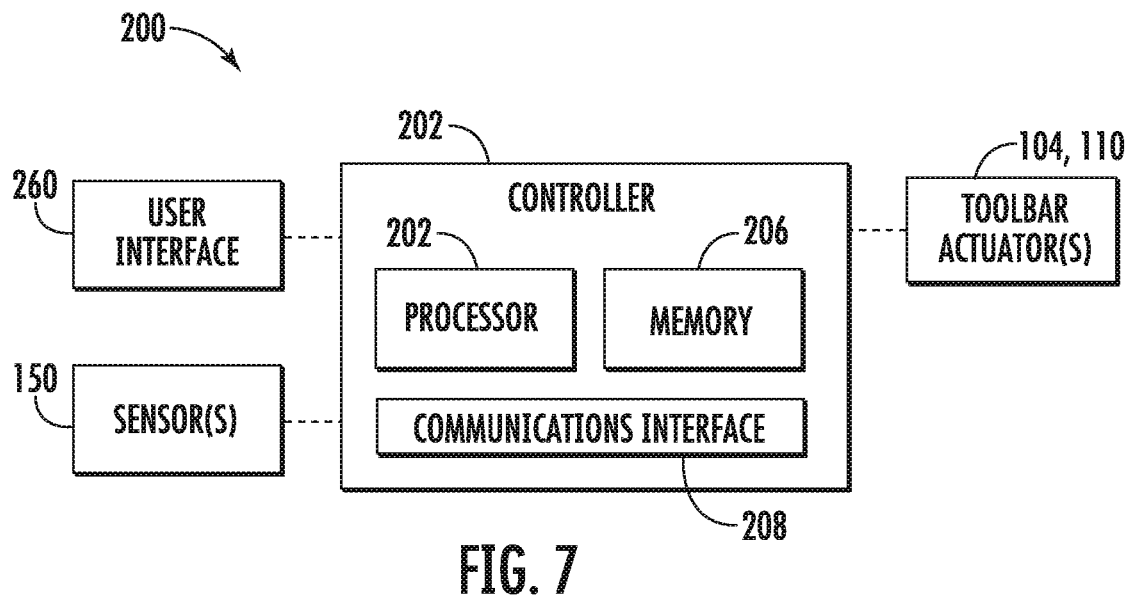
FIG. 7 illustrates a schematic view of one embodiment of a system for adjusting the alignment of ground engaging tools of a ground engaging assembly of an agricultural implement in accordance with aspects of the present subject matter.

Referring now to FIG. 7, a schematic view of one embodiment of a system 200 for adjusting the alignment of ground engaging tools of a ground engaging assembly of an agricultural implement is illustrated in accordance with aspects of the present subject matter. In general, the system 200 will be described herein with reference to the implement 10 described above with reference to FIGS. 1-2 and the system 200 described above with reference to FIGS. 3-6. However, it should be appreciated by those of ordinary skill in the art that the disclosed system 200 may generally be utilized with agricultural implements having any other suitable implement configuration and/or with ground engaging assemblies/tools having any other suitable assembly/tool configuration.

As shown in FIG. 7, the system 200 may include a controller 202 configured to electronically control the operation of one or more components of the agricultural implement 10. In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

In several embodiments, the controller 202 may correspond to an existing controller of the agricultural implement 10 and/or of the work vehicle 12 to which the implement 10 is coupled. However, it should be appreciated that, in other embodiments, the controller 202 may instead correspond to a separate processing device. For instance, in one embodiment, the controller 202 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 202 may be configured to include a communications module or interface 208 to allow for the controller 202 to communicate with any of the various other system components described herein. For instance, as described above, the controller 202 may, in several embodiments, be configured to receive data inputs from one or more sensors of the agricultural implement 10 that are used to detect one or more parameters associated with material accumulation relative to the associated ground engaging assembly, particularly between a pair of adjacent ground engaging tools of the associated ground engaging assembly. For instance, the controller 202 may be communicatively coupled to one or more material accumulation sensors 150 via any suitable connection, such as a wired or wireless connection, to allow data indicative of material accumulation between the adjacent ground engaging tools to be transmitted from the sensor(s) 150 to the controller 202. Further, the controller 202 may, in sonic embodiments, be communicatively coupled to one or more components of the implement 10, such as the implement actuator(s) 104, 110, and/or the user interface 260, to allow the controller 202 to control such components.

The controller may be configured to perform one or more implement-related control actions based on the receipt of an input associated with adjusting the alignment of ground engaging tools of a ground engaging assembly of an agricultural implement, for example, based on the data received from one or more sensors associated with the implement 10 or an input via the user interface 260. Specifically, the controller 202 may be configured to control one or more components of the agricultural implement 10 based on the inputs. For example, as shown in FIG. 7, the controller 202 may be configured to control the operation of the actuator 110 to actuate the second toolbar 48B relative to the first toolbar 48A from its first toolbar position towards its second toolbar position to adjust the alignment between the first and second rotational axes 100A, 100B of the first and second pluralities of disk blades 46A, 46B, and thus the alignment of the first and second pluralities of disk blades 46A, 46B. The controller 202 may alternatively or additionally be configured to control the actuator 110 to actuate the second toolbar 48B relative to the first toolbar 48A back to its first toolbar position.

Specifically, referring back to FIGS. 3-6, in one embodiment, an input may be received from one or more material accumulation sensors 150 that includes or is associated with data indicative of material accumulation relative to adjacent ground engaging tools (e.g., disk blades 46A, 46B) of the implement 10. Thus, in several embodiments, the controller 202 may be configured to determine the presence of material accumulation relative to the ground engaging tools based on the data received from the material accumulation sensor(s) 150. For example, the controller 202 may include one or more suitable algorithms stored within its memory 206 that, when executed by the processor 204, allow the controller 202 to infer or estimate the presence of material accumulation relative to the ground engaging tools based on the data received from the material accumulation sensor(s) 150. Alternatively, the controller 202 may be configured to receive an input indicative of such material accumulation from an operator of the implement 10 via the user interface 260.

In such embodiment, the controller 202 may be configured to control the operation of the actuator 110 to actuate the second toolbar 48B relative to the first toolbar 48A from its first toolbar position to its second toolbar position, or any position therebetween, to adjust the spacing between the rotational axes 100A, 100B, and thus the alignment of the first and second pluralities of disk blades 46A, 46B, upon the determination of material accumulation. Generally, as indicated above, by adjusting the spacing between the rotational axes 100A, 100B, either by increasing or decreasing the distance along the longitudinal direction L1 and/or the vertical direction V1, the material accumulation formed relative to the ground engaging tools may be reduced.

Further, in some embodiments, the controller 202 may be configured to control the disk assembly actuator(s) 104 associated with the disk assembly 44 based on the input associated with adjusting the spacing between the tools of the ground engaging assembly. For instance, the controller 202 may be configured to control the down force on the disk assembly 44 to adjust a penetration depth of the disk blades 46A, 46B of the disk assembly 44. In some embodiments, for example, the controller 202 may be configured to increase the down force on the disk assembly 44, such that, upon determination of the plugged condition, the penetration depth of the second plurality of disk blades 46B is maintained when actuating the second toolbar 48B from the first toolbar position to the second toolbar position, and may return the disk assembly 44 to its normal working penetration depth after the actuation of the actuator 210 to move the second toolbar 48B back to its first position.

Moreover, in some embodiments, the controller 202 may be configured to indicate to an operator the operating conditions of the ground engaging tools, such as a current alignment of the ground engaging tools, the field conditions, and/or recommended control actions. For example, in the embodiment shown in FIG. 7, the communications module 208 may allow the controller 202 to communicate with a user interface 260 having a display device configured to display information to an operator. However, it should be appreciated that the controller 202 may instead be communicatively coupled to any number of other indicators, such as lights, alarms, and/or the like to indicate the operating conditions to the operator. In one embodiment, the controller 202 may generate a notification indicating to an operator a presence of excessive material accumulation relative to the ground engaging tools (e.g., amount, frequency, duration, patterns, and/or the like). For example, the controller 202 may generate a notification indicating the presence of material accumulation when excessive material accumulation is still present after the second toolbar 48A is actuated to its second toolbar position.

Figure 8:
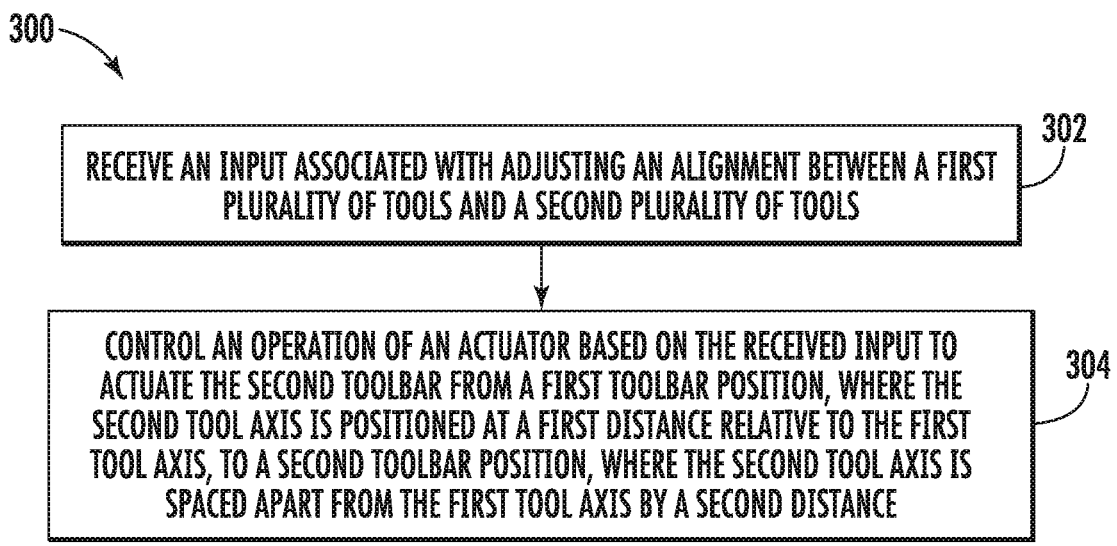
FIG. 8 illustrates a flow diagram of one embodiment of a method for adjusting the alignment of ground engaging tools of a ground engaging assembly of an agricultural implement in accordance with aspects of the present subject matter.

Referring now to FIG. 8, a flow diagram of one embodiment of a method 300 for adjusting the alignment of ground engaging tools of a ground engaging assembly of an agricultural implement is illustrated in accordance with aspects of the present subject matter. In general, the method 300 will be described herein with reference to the implement 10 and the work vehicle 12 shown in FIGS. 1 and 2, the system 200 shown in FIGS. 3-6, as well as the various system components shown in FIG. 7. However, it should be appreciated that the disclosed method 300 may be implemented with work vehicles and/or implements having any other suitable configurations and/or within systems having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 8, at (302), the method 300 may include receiving an input associated with adjusting an alignment between a first plurality of tools and a second plurality of tools. For instance, as indicated above, the controller 202 may receive an input indicative of a request to adjust the alignment between the first and second plurality of tools 46A, 46B. In one embodiment, such input is received from a sensor, such as the material accumulation sensor 150, and/or from an operator via the user interface 260.

Additionally, as shown at (304), the method 300 may include controlling the operation of an actuator based on the received input to actuate a second toolbar relative to a first toolbar from a first toolbar position, where the second tool axis is positioned at a first distance relative to the first tool axis, to a second toolbar position, where the second tool axis is spaced apart from the first tool axis by a second distance. For instance, as indicated above, the controller 202 may control the operation of the actuator 110 to actuate the second toolbar 48B between its first and second toolbar positions relative to the first toolbar 48A, such that the second axis 100B of the second plurality of disk blades 46B is moved from being spaced apart from the first axis 1004 of the first plurality of disk blades 464 by a first distance D1 to being spaced apart from the first axis 100A of the first plurality of disk blades 46A by a second distance D2, D3, D4, where the second distance D2, D3, D4 is greater than the first distance D1.

Figure 9:
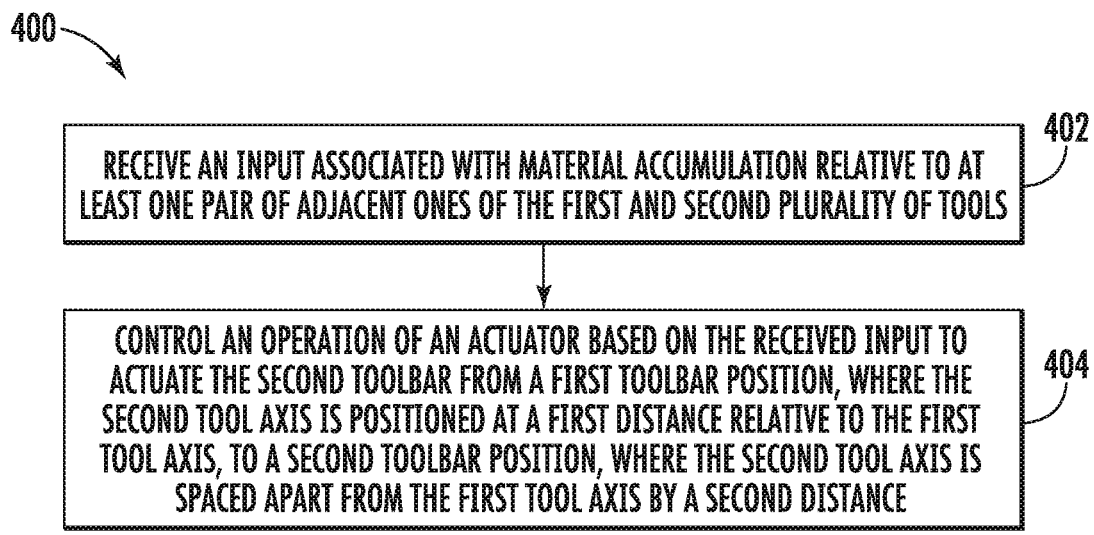
FIG. 9 illustrates a flow diagram of one embodiment of a method for managing material accumulation relative to ground engaging tools of a ground engaging assembly of an agricultural implement in accordance with aspects of the present subject matter.

Referring now to FIG. 9, a flow diagram of one embodiment of a method 400 for managing material accumulation relative to ground engaging tools of a ground engaging assembly of an agricultural implement is illustrated in accordance with aspects of the present subject matter. In general, the method 400 will be described herein with reference to the implement 10 and the work vehicle 12 shown in FIGS. 1 and 2, the system 200 shown in FIGS. 3-6, as well as the various system components shown in FIG. 7. However, it should be appreciated that the disclosed method 400 may be implemented with work vehicles and/or implements having any other suitable configurations and/or within systems having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 9, at (402), the method 400 may include receiving an input associated with material accumulation relative to at least one pair of adjacent ones of the first and second plurality of tools. For instance, as indicated above, the controller 202 may receive an input indicative of a request to manage excessive material accumulation relative to at least one pair of adjacent ones of the first and second plurality of tools, such as excessive material accumulation relative to at least one pair of adjacent ones of the first and second pluralities of disk blades 46A, 46B. In one embodiment, such input is received from a sensor, such as the material accumulation sensor 150, and/or from an operator via the user interface 260.

Additionally, as shown at (304), the method 300 may include controlling an operation of an actuator based on the received input to actuate a second toolbar relative to a first toolbar from a first toolbar position, where the second tool axis is positioned at a first distance relative to the first tool axis, to a second toolbar position, where the second tool axis is spaced apart from the first tool axis by a second distance. For instance, as indicated above, the controller 202 may control the operation of the actuator 110 to actuate the second toolbar 48B between its first and second toolbar positions relative to the first toolbar 48A, such that the second axis 100B of the second plurality of disk blades 46B is moved from being spaced apart from the first axis 100A of the first plurality of disk blades 46A by a first distance D1 to being spaced apart from the first axis 100A of the first plurality of disk blades 46A by a second distance D2, D3, D4, where the second distance D2, D3, D4 is greater than the first distance D1.

It is to be understood that the steps of the methods 300, 400 are performed by the controller 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 202 described herein, such as the methods 300, 400, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the methods 300, 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for adjusting the alignment of ground engaging tools of an agricultural implement, the system comprising:
    a first toolbar configured to support a first plurality of tools, the first plurality of tools being aligned along a first tool axis;
    a second toolbar configured to support a second plurality of tools, the second plurality of tools being aligned along a second tool axis, the second toolbar being movable relative to the first toolbar between a first toolbar position and a second toolbar position such that the second tool axis is movable relative to the first tool axis, a portion of at least one tool of the second plurality of tools being positioned axially between an adjacent pair of tools of the first plurality of tools when the second toolbar is in the first toolbar position; and
    an actuator configured to actuate the second toolbar between the first and second toolbar positions,
    wherein, when the second toolbar is in the first toolbar position, the second tool axis is positioned at a first distance relative to the first tool axis, and
    wherein, when the second toolbar is in the second toolbar position, the second tool axis is spaced apart from the first tool axis by a second distance, the second distance being greater than the first distance.

2. The system of claim 1, wherein, when the second toolbar is in the first toolbar position, each tool of the second plurality of tools is positioned axially between a respective pair of adjacent tools of the first plurality of tools such that the first and second pluralities of tools are provided in an alternating arrangement along the first tool axis.

3. The system of claim 1, wherein the second toolbar defines a rotational axis extending along a length of the toolbar,
    wherein the actuator comprises a rotary actuator configured to pivot the second toolbar about the rotational axis between the first and second toolbar positions.

4. The system of claim 1, wherein the first and second toolbar positions are spaced apart longitudinally from each other such that the actuator is configured to move the second toolbar longitudinally between the first and second toolbar positions.

5. The system of claim 1, wherein the first and second toolbar positions are spaced apart vertically from each other such that the actuator is configured to move the second toolbar vertically between the first and second toolbar positions.

6. The system of claim 1, further comprising a controller configured to adjust the alignment of the first and second pluralities of tools by controlling an operation of the actuator to actuate the second toolbar between the first and second toolbar positions.

7. The system of claim 6, wherein the controller is further configured to receive an input indicative of excessive material accumulation relative to at least one adjacent pair of tools of the first and second pluralities of tools, the controller being configured to control the operation of the actuator upon receipt of the input to actuate the second toolbar between the first and second toolbar positions.

8. The system of claim 1, wherein the first and second pluralities of tools comprise first and second pluralities of disk blades, respectively, the first plurality of disk blades being rotatable about the first tool axis and the second plurality of disk blades being rotatable about the second tool axis.

9. The system of claim 8, wherein, when the second toolbar is in the first toolbar position, the first distance is equal to or less than a radius of the first plurality of disk blades.

10. The system of claim 1, wherein the first and second tool axes are coaxially aligned when the second toolbar is in the first toolbar position such that the first distance is equal to zero.

11. The system of claim 1, wherein the first toolbar is positioned forward of the second toolbar along a direction of travel of the implement.

12. An agricultural implement, comprising:
a frame;
a first toolbar supported by the frame member, the first toolbar being configured to support a first plurality of disk blades, the first plurality of disk blades being rotatable about a first tool axis;
a second toolbar supported by the frame member, the second toolbar being configured to support a second plurality of disk blades, the second plurality of disk blades being rotatable about a second tool axis, the second toolbar being movable relative to the first toolbar between a first toolbar position and a second toolbar position such that the second tool axis is movable relative to the first tool axis,
wherein, when the second toolbar is in the first toolbar position, the second tool axis is positioned at a first distance relative to the first tool axis, the first distance being less than or equal to a radius of the first plurality of disk blades, and
wherein, when the second toolbar is in the second toolbar position, the second tool axis is spaced apart from the first tool axis by a second distance, the second distance being greater than the first distance.

13. The agricultural implement of claim 12, further comprising an actuator configured to actuate the second toolbar between the first and second toolbar positions.

14. The agricultural implement of claim 13, wherein the actuator is configured to at least one of pivot the second toolbar between the first and second toolbar positions, move the second toolbar vertically between the first and second toolbar positions, or move the second toolbar laterally between the first and second toolbar positions.

15. The agricultural implement of claim 13, further comprising a controller configured to adjust the alignment of the first and second pluralities of disk blades by controlling an operation of the actuator to actuate the second toolbar between the first and second toolbar positions.

16. A method for adjusting the alignment of ground engaging tools of an agricultural implement, the agricultural implement comprising a first toolbar configured to support a first plurality of tools, the first plurality of tools being aligned along a first tool axis, the agricultural implement further comprising a second toolbar configured to support a second plurality of tools, the second plurality of tools being aligned along a second tool axis, the method comprising:
receiving, with a computing device, an input associated with adjusting the alignment between the first plurality of tools and the second plurality of tools; and
controlling, with the computing device, an operation of an actuator based on the received input to actuate the second toolbar relative to the first toolbar from a first toolbar position, where the second tool axis is positioned at a first distance relative to the first tool axis, the first distance being less than or equal to a predetermined spacing distance, to a second toolbar position, where the second tool axis is spaced apart from the first tool axis by a second distance, the second distance being greater than the first distance,
wherein a portion of at least one tool of the second plurality of tools is positioned axially between an adjacent pair of tools of the first plurality of tools when the second toolbar is in the first toolbar position.

17. The method of claim 16, further comprising controlling, with the computing device, the operation of the actuator to actuate the second toolbar relative to the first toolbar back to the first toolbar position.

18. The method of claim 16, wherein the input is associated with adjusting the alignment between the first plurality of tools and the second plurality of tools to address excessive material accumulation relative to at least one pair of adjacent ones of the first and second pluralities of tools.

19. The method of claim 16, wherein the second toolbar defines a rotational axis extending along a length of the toolbar, wherein controlling the operation of the actuator comprises controlling the operation of the actuator such that the second toolbar is pivoted about the rotational axis between the first and second toolbar positions.

20. The method of claim 16, wherein the first and second toolbar positions are spaced apart vertically from each other, wherein controlling the operation of the actuator comprises controlling the operation of the actuator such that the second toolbar is moved vertically between the first and second toolbar positions.

* * * * *